United States Patent [19]
Khoo et al.

[11] Patent Number: 5,842,420
[45] Date of Patent: Dec. 1, 1998

[54] CRANKSHAFT LUBRICATION SYSTEM

[76] Inventors: Chew Thong Khoo; Kerk Kan Yeo, both of Matsushita Refrigeration Industries (S) Pte Ltd., No. 1 Bedok South Road, Singapore 1646, Singapore

[21] Appl. No.: 117,860

[22] Filed: Sep. 7, 1993

[30]     Foreign Application Priority Data

Sep. 7, 1992 [GB] United Kingdom .................... 9218873

[51] Int. Cl.$^6$ ..................................................... F01M 1/06
[52] U.S. Cl. ..................... 184/6.16; 184/6.18; 417/902; 418/94
[58] Field of Search ................................. 184/6.16, 6.18; 417/902; 418/94

[56]             References Cited

U.S. PATENT DOCUMENTS

| | | | |
|---|---|---|---|
| 3,646,756 | 3/1972 | Langlois ........................... | 415/88 |
| 3,674,382 | 7/1972 | Kubota et al. ..................... | 184/6.18 |
| 4,236,879 | 12/1980 | Abe .................................. | 184/6.18 |
| 4,762,477 | 8/1988 | Hayano et al. .................... | 418/94 |
| 4,865,527 | 9/1989 | Pierd et al. ....................... | 417/902 |
| 5,088,579 | 2/1992 | Kim et al. . | |

FOREIGN PATENT DOCUMENTS

| | | | |
|---|---|---|---|
| 0516091 | 8/1955 | Canada ............................. | 184/6.18 |
| 0212687 | 9/1986 | Japan ................................ | 418/94 |

*Primary Examiner*—Christopher Verdier

[57]             ABSTRACT

A crankshaft lubrication system is provided for generating increased oil pumping capacity and oil pressure in a sealed compressor for cooling fluids. The lower portion of an integral crankshaft is cut at a slanted angle to increase the inlet area for picking up more oil from a sump or oil reservoir. By varying the angle of cut at the lower portion of an integral crankshaft, one achieves oil pumping rates over a wide range of values while using a standard size crankshaft. This approach not only simplifies the manufacture of lubrication system for sealed compressors, but also lowers the overall production costs of such compressors. While the efficiency of sealed compressors is maintained under the present invention, the noise emissions from such compressors are lowered significantly.

4 Claims, 5 Drawing Sheets

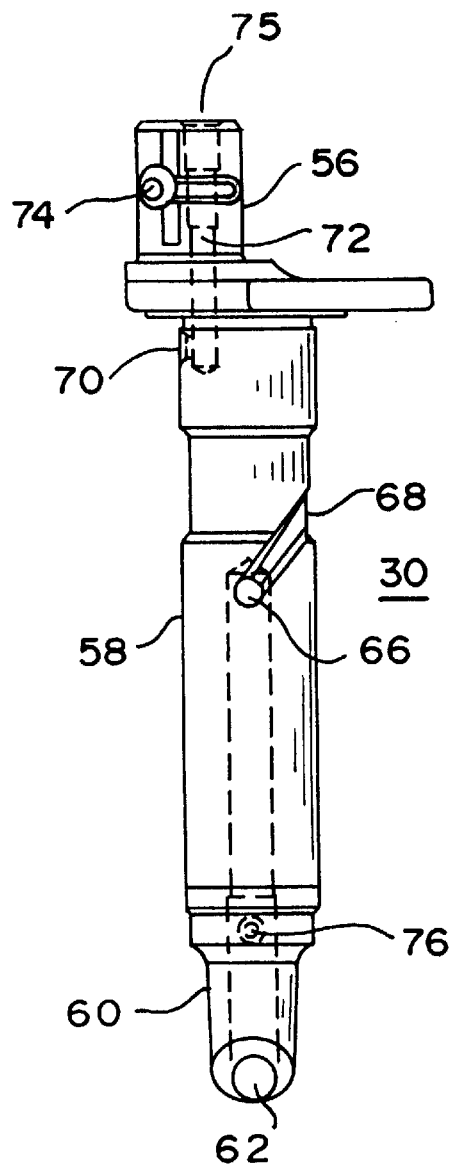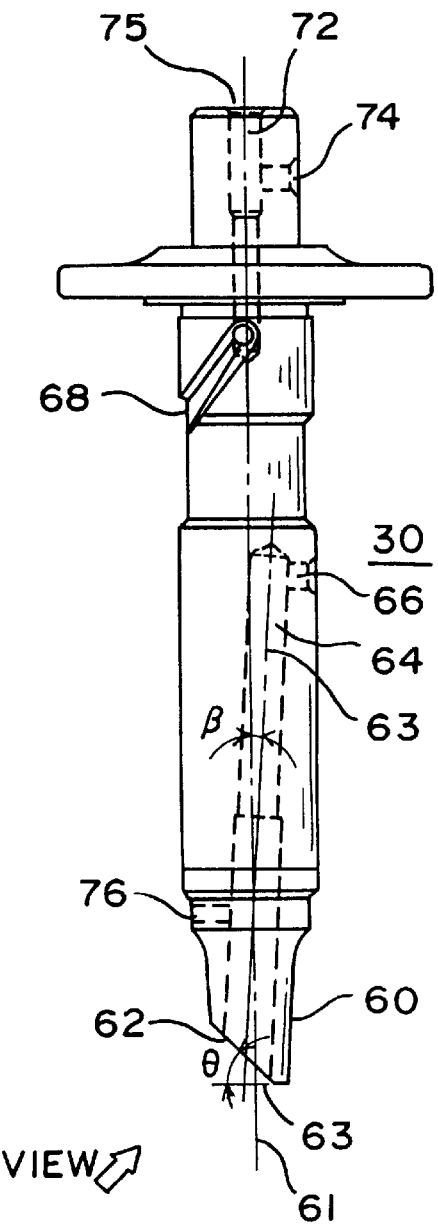
FIG. 4
FIG. 5

CRANKSHAFT LUBRICATION SYSTEM

BACKGROUND OF THE INVENTION

1. Field of the Invention

This invention relates to improvements in the lubrication system of rotating machines, and in particular, of sealed reciprocating and rotary compressors for refrigeration and air conditioning.

2. Description of the Related Art

The lubrication of sealed compressors for cooling fluids is well known in the art. Typically, an electric motor drive is built into a sealed housing or shell, and has a stator or electric armature affixed therein and a rotor assembly assembled into the cylindrical passage of the stator. This rotor assembly includes a rotor and a crankshaft which is inserted into the cylindrical passage of the rotor by interference fit. This crankshaft is rotationally supported and journalled in a bearing housing in either one or both sides of the rotor. As these compressors are mounted vertically, i.e., with the rotor axis vertical, oil or lubricant reposes in a sump at the base of the crankshaft. Lubrication is effected when the rotary motion of the crankshaft drives the oil by centrifugation upward from the sump through the hollow center of the crankshaft. Conventional crankshafts have in some cases one or more axial bores disposed off axis and in other cases helical shape oil groove on the external surface of the crankshaft to carry oil to the upper portion of the crankshaft, where oil passes through one or more lubricating channels to lubricate and to cool the bearings or other moving parts.

As temperature rises within the sealed compressors after some length of operation, the oil pumping capacity of conventional lubrication system decreases as the viscosity of the lubricating oil diminishes. U.S. Pat. No. 4,865,527 taught the improvement of using an oil pick up tube which featured a spring positioned within the oil pick up tube. The springs took several forms including ring and plate; the function remains the same: to scoop up the oil in the sump in order to compensate for the loss in viscosity of the oil. The requirement for the oil pick up tube and springs which must be positioned within the shaft necessitates additional material and process costs. As such, this approach raises production cost of the rotor assembly.

U.S. Pat. No. 5,007,808 disclosed a slotted rotor lubrication system which employed a smaller than usual rotor shaft. It is claimed that the slotted rotor lubrication system would lower the production costs by reducing the use of shaft material and reducing machining requirements. It is unclear whether the corresponding modifications required on the rotor will reduce the overall production and manufacturing costs of the rotor assembly of a sealed compressor.

SUMMARY OF THE INVENTION

It is an object of the present invention to provide a vertical-axis crankshaft for a sealed compressor with increased pumping capacity and increased oil pressure.

It is a further object of the present invention to simplify the crankshaft lubrication system of sealed compressors.

It is yet another object of this present invention to lower the overall production cost of sealed compressors by eliminating the use of oil pick up tube and spring or oil plate.

It is also an object of this present invention reduce the noise emissions from sealed compressors.

A crankshaft lubrication system is described for generating increased oil pumping capacity and oil pressure in a sealed compressor for cooling fluids. The lower portion of an integral crankshaft is cut at a slanted angle to increase the inlet area for picking up more oil from a sump or oil reservoir. By varying the angle of cut at the lower portion of an integral crankshaft, one achieves oil pumping rates over a wide range of values while using a standard size crankshaft. This approach not only simplifies the manufacture of lubrication system for sealed compressors, but also lowers the overall production costs of such compressors. While the efficiency of sealed compressors is maintained under the present invention, the noise emissions from such compressors are lowered significantly.

BRIEF DESCRIPTION OF THE DRAWINGS

FIG. 4 illustrates a longitudinal front view of the preferred embodiment of the present invention.

FIG. 5 illustrates a longitudinal side view of the preferred embodiment of the present invention.

DESCRIPTION OF THE PREFERRED EMBODIMENT

A crankshaft lubrication system for generating increased oil pumping capacity in a sealed compressor is described. In the following description, numerous specific details are set forth such as specific parts of a crankshaft in order to provide a thorough understanding of the present invention. In other instances, well known elements such as the rotor and the stator of the electric motor drive are not described in detail in order not to unnecessarily obscure the present invention. It should be understood by one skilled in the art that a sealed compressor referred to both the reciprocating and rotary types.

Figure 1:
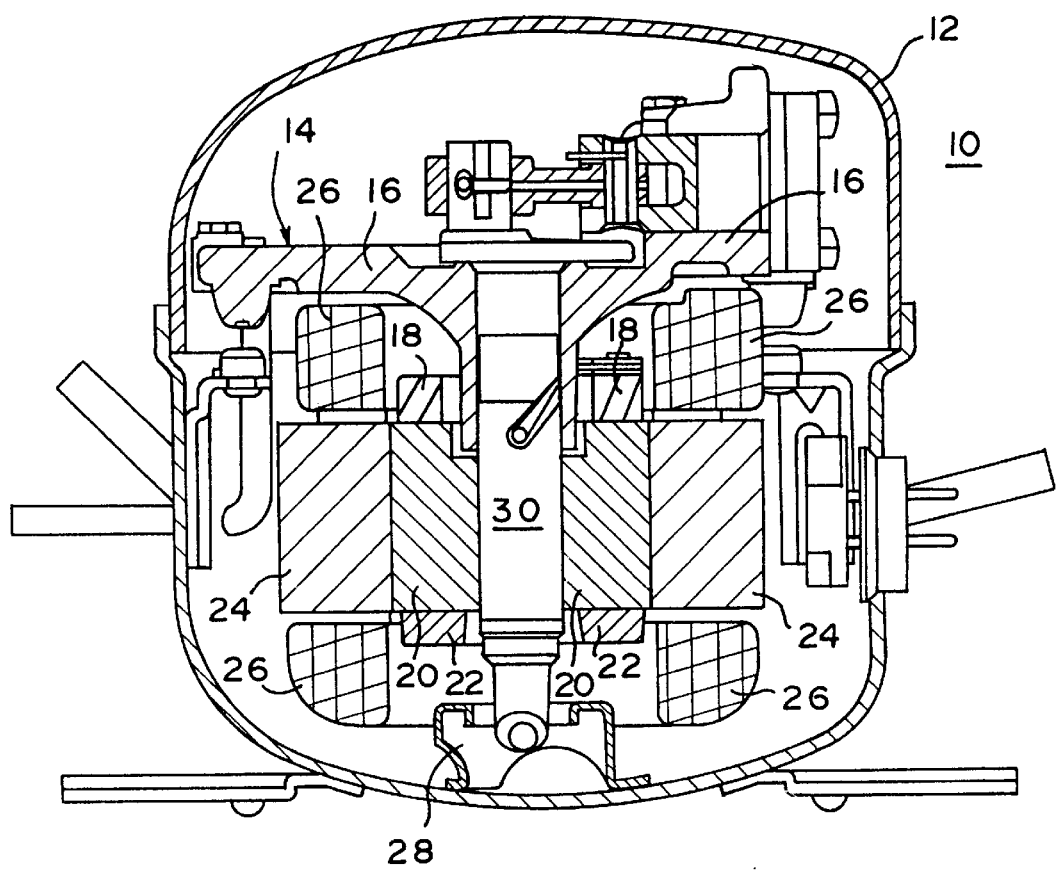
FIG. 1 illustrates a longitudinal sectional view of a sealed compressor of cooling fluids, in which the improvements are applied according to the present invention.

Referring to FIG. 1, a sealed compressor 10 includes a sealed casing 12 with an electric motor-driven assembly 14 housed in the interior thereof. The assembly 14 includes a bearing housing 16, a rotor assembly having upper rotor ring 18, rotor 20 and lower rotor ring 22. The rotor assembly fits into a cylindrical passage in the stator 24 and coil 26. A sump or oil reservoir 28 is located at the lower end of the electric motor-driven assembly 14. The rotor assembly further includes a crankshaft 30 that is rotationally supported and journalled in the bearing housing 16. The lower portion of said crankshaft 30 reposes in the sump 28. Lubrication is effected when the rotary motion of the crankshaft 30 drives the oil by centrifugation upward from the sump 28 through the hollow center (not shown) of the crankshaft.

Figure 2:
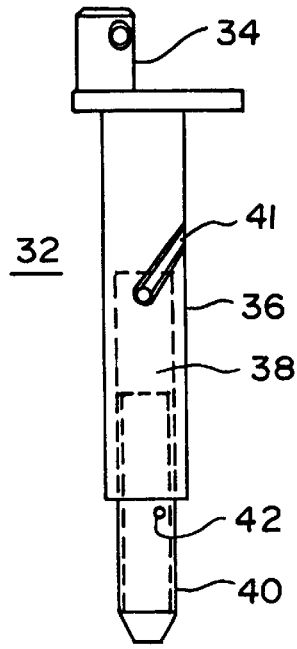
FIG. 2 illustrates a longitudinal front view of a prior art crankshaft with an oil pick up tube.

With reference to FIG. 2 is a drawing of a prior art crankshaft 32. The crankshaft 32 featured a crank 34 in the upper portion, a shaft 36 in the center, an axial bore 38, and an oil pick up tube 40 in the lower portion. The oil pick up tube 40 is coupled at one end to the axial bore 38. The other end of the oil pick up tube 40 is dipped into a sump of a sealed compressor, both of which are not shown. Oil within the sump is drawn upwards by centrifugation via the oil pick up tube 40 and the axial bore 38 to oil groove 41 where the bearing housing is lubricated and cooled. The disadvantage of the prior art crankshaft illustrated in FIG. 2 is its limited oil pumping capacity because the area for picking up oil is limited. Furthermore, as the temperature rises after some length of operation, the viscosity of oil decreases. As result, the oil pumping capacity of the lubrication system is reduced.

Figure 3:
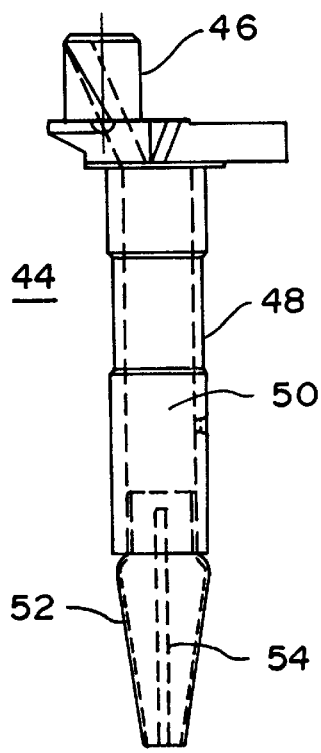
FIG. 3 illustrates a longitudinal front view of another prior art crankshaft with an oil pick up tube and a plate oil supplier.

FIG. 3 illustrates another prior art crankshaft 44 for improving the oil pumping capacity of sealed compressors. The crankshaft 44 has a crank 46, a shaft 48 having an interior lubricating duct 50, an oil pick up tube 52 featuring a plate-oil supplier 54 positioned therein. Here, the plate-oil supplier 54 refers generically to a broad class of devices which are inserted into the oil pick up tube for increasing the oil pumping capacity of the crankshaft lubricating system. An example of the plate-oil supplier 54 is the spring taught in U.S. Pat No. 4,865,527. Another example is the solid plate as shown in FIG. 3. The crankshaft 44 operates on the same principle as crankshaft 32 except that the plate-oil supplier 54 provided a greater surface area for picking up oil from the sump. While the problem of oil pumping capacity was partially addressed by lubricating systems featuring crankshaft 44, the production costs of manufacturing such a crankshaft is high.

Referring to FIGS. 4 and 5, the preferred embodiment of the present invention is illustrated in alternate views. The improved lubrication system of the present invention features an improved crankshaft 30 having an integral body including a crank 56, a shaft 58 and a lower portion 60. The lower portion 60 of the crankshaft 30 has a substantially conical section submerged in the sump (not shown) and terminating with an elliptical opening 62. Referring to FIG. 5, the plane of the elliptical opening 62 has an angle of cut θ with an imaginary horizontal-axis 63. The imaginary-axis 63 is perpendicular to an imaginary vertical-axis 61 of the crankshaft 30.

Referring again to FIGS. 4 and 5, the crankshaft 30 is provided with a slanted interior lubrication duct 64 which communicates between the elliptical opening 62 and the port 66. The interior lubrication duct 64 has an angle β with the imaginary vertical-axis 61 of the crankshaft 30. A bearing groove 68 on the exterior surface of the crankshaft 30 provides the distribution channel between the ports 66 and 70. An eccentric lubrication duct 72 communicates among outflow orifices 70, 74 and 75. It should be understood by one skilled in the art that the longitudinal axis of the lubrication duct 72 may be at an angle with the imaginary vertical-axis 61 of the crankshaft 30. A bleeding orifice 76 is provided for venting air bubbles in the oil while it is being picked up from the sump.

When the electric motor of the sealed compressor drives the rotor, the crankshaft 30 rotates and the elliptical opening 62 acts as a scoop to pick up oil from the sump continuously by centrifugal action. There the oil is drawn upwards through the slanted lubrication duct 64 and exits port 66. The oil then moves further upwards through the annulus formed by the bearing groove 68 and the interior wall of the bearing housing 18 as shown in FIG. 1. The oil then enters the eccentric lubrication duct 72 through the port 70. Through Outflow orifices 74 and 75 the oil is dispersed into the casing and moving parts of the sealed compressor.

Figure 6:
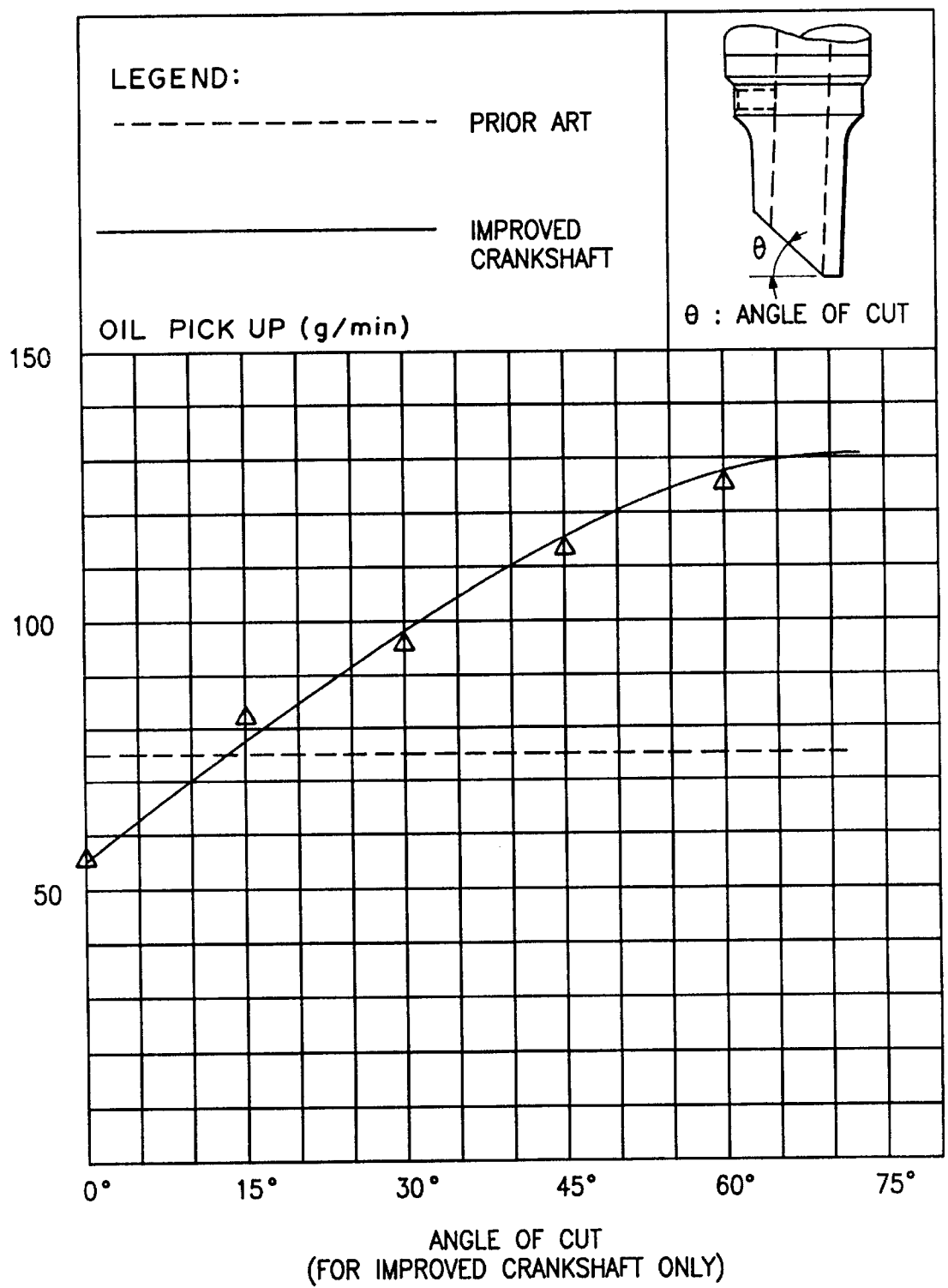
FIG. 6 illustrates the oil pick up characteristics of a sealed compressor using a prior art crankshaft versus one using the preferred embodiment of the present invention.

FIG. 6 is a table summarising the oil pick rate of a lubrication system using a prior art crankshaft according to FIG. 3 versus one using the preferred embodiment of the present invention. It is worthwhile noting that with an angle of cut θ of more than 15 decrees, the oil pick up rate measured in grams per minute is equivalent to that of a lubrication system using prior art crankshafts. The data for the oil pick up rate in FIG. 6 also confirm that the preferred embodiment of the present invention could deliver as much as 1.5 times the normal oil pick up rate without changing the diameter of the crankshaft. All one needs to do is to increase the angle of cut θ accordingly. Alternatively, a combination of angles of cut θ and angle β for the interior lubrication duct 64 could increase the oil pick up rate to suit a large variety of applications. It follows that the present invention not only increases the oil pumping capacity of lubrication systems, but also simplifies the manufacture of such systems.

Figure 7:
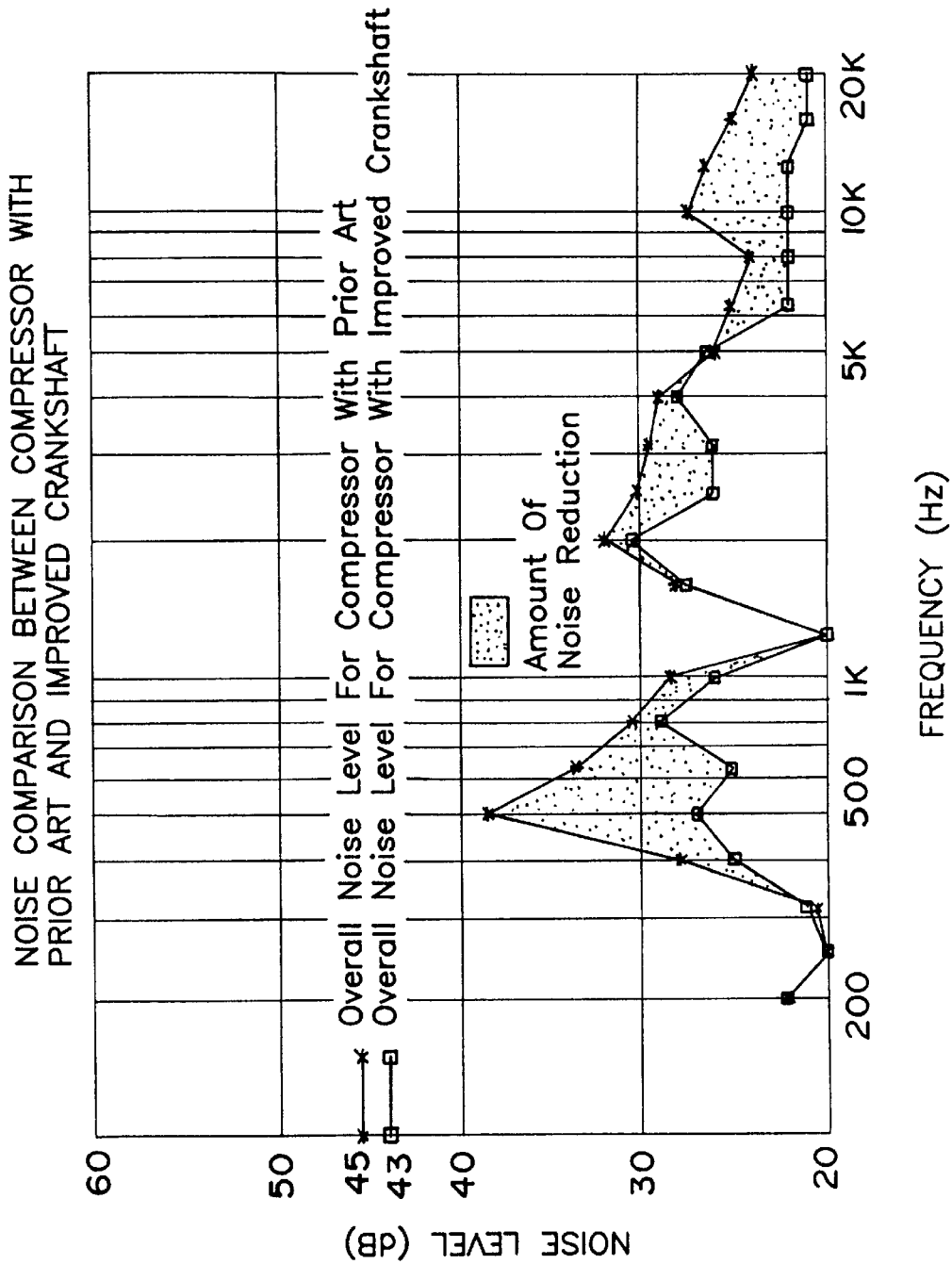
FIG. 7 illustrates the noise emissions from a sealed compressor using the prior art crankshaft versus one using the preferred embodiment of the present invention.

FIG. 7 is a chart comparing the noise emissions of sealed compressor using a prior art crankshaft in accordance to FIG. 3 versus one using the preferred embodiment of the present invention. In each case, the noise sensor is placed 10 cm from the exterior of the sealed casing of an identical compressor. Over the entire range of frequencies, lubrication system using the preferred embodiment of the present invention emitted less noise than one using prior art crankshafts. Referring again to FIG. 7, the noise reduction is at an maximum—almost 10 decibel (dB) at 500 hertz (Hz). Moreover, a compressor using the preferred embodiment of the present invention achieved noise reduction over one using a prior art crankshaft at almost every frequency which was tested, e.g., 200 Hz to 20,000 Hz.

While the present invention has been particularly described with reference from FIGS. 1 to 7 with emphasis on the crankshaft lubrication system for a sealed compressor for cooling fluids, it should be understood that the figures are for illustration only and should not be taken as a limitation on the invention. In addition, it is clear that the apparatus of the present invention has utility in many applications where lubrication and cooling of compressors bearings and moving parts are required. It is contemplated that many changes and modifications may be made by one of ordinary skill in the art without departing from the spirit and the scope of the invention as described.

What is claimed is:

1. In a sealed compressor including a sealed casing in which at least one alternating motor-driven compressor assembly and at least one oil reservoir are disposed therein, the assembly including at least one vertical-axis crankshaft being provided with at least one longitudinal lubrication duct communicating with points on an exterior surface of said crankshaft and with an upper end of said crankshaft eccentrically to the axis of rotation thereof, said assembly including a lower member coupled to a lower end of said interior duct of the crankshaft and comprising a substantially conical nose section adapted to be submerged in said oil reservoir, the improvement comprising said lower member being integrated with said crankshaft, said conical nose section of said lower member terminating in an elliptical opening, the plane parallel with said elliptical opening having an angle of cut θ with an imaginary plane, said vertical-axis of rotation of said crankshaft.

2. In a sealed compressor including a sealed casing in which at least one alternating motor-driven compressor assembly and at least one oil reservoir are disposed therein, the assembly including at least one vertical-axis crankshaft provided with at least one interior lubrication duct communicating with points on an exterior surface of said crankshaft and with an upper end of said crankshaft eccentrically to the axis of rotation thereof, said assembly including a lower member coupled to a lower end of said interior duct of the crankshaft and comprising a substantially conical nose section adapted to be submerged in said oil reservoir, the upper end of said interior lubrication duct ending in a first substantially conical section and a second substantially conical section of variable contour depending on a profile of the upper end of the crankshaft, the improvement comprising said lower member being integrated with said crankshaft, said conical nose section of said lower member terminating in an elliptical opening, the plane parallel with said elliptical opening having an angle of cut $\theta$ with an imaginary plane, said imaginary plane being perpendicular to the vertical-axis of rotation of said crankshaft.

3. A crankshaft according to claim 2 wherein the longitudinal-axis of said interior lubrication duct has an angle $\beta$ with respect to the vertical-axis of said crankshaft.

4. A crankshaft according to claim 3 wherein the angle $\beta$ is equal or greater than zero degrees and less than forty five degrees.

* * * * *